March 31, 1959
A. I. APPLETON
2,879,912
ADJUSTABLE MOUNTING FLANGE FOR SWITCH BOXES AND THE LIKE
Filed Feb. 13, 1956
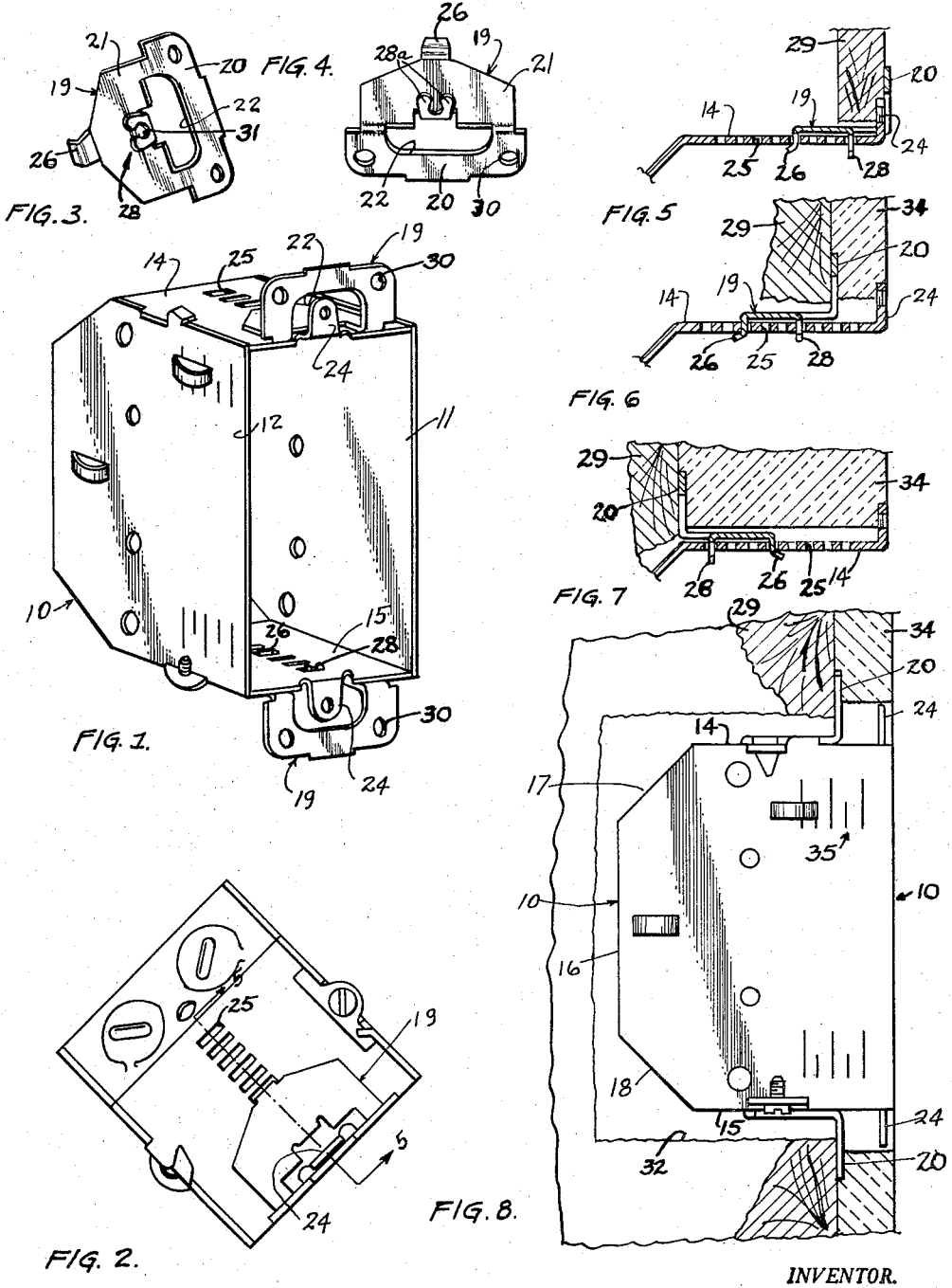
INVENTOR.
ARTHUR I. APPLETON
BY
Carlson, Pitzner, Hubbard & Wolfe
ATTYS.

United States Patent Office 2,879,912
Patented Mar. 31, 1959

2,879,912

ADJUSTABLE MOUNTING FLANGE FOR SWITCH BOXES AND THE LIKE

Arthur I. Appleton, Northbrook, Ill.

Application February 13, 1956, Serial No. 565,017

3 Claims. (Cl. 220—3.9)

The present invention relates in general to the field of electrical boxes for use in wiring buildings and, more specifically, to a novel device of this nature finding particular but not exclusive utility when embodied in a switch box of the type adapted to be recessed in a wall.

In many building installations it is desired to mount a switch box or the like within a wall recess in such a manner that the front of the box extends outwardly a predetermined distance from the wall studs, rock lath or other component material of the wall. In this way, after mounting the box a finished layer, such as plaster or the like, of any desired thickness may be applied to the wall and yet the switch box will be flush mounted therein.

Thus, one object of the invention is to provide a box of the character set forth and having a quickly adjustable mounting arrangement so as to accommodate a wide variety of finish wall thicknesses.

Another object is to provide a box of the foregoing type wherein the adjustment of the mounting can be effected by hand without necessity for using tools.

A further object is to provide a box of the type set forth which is of simple, economical construction and susceptible of manufacture on a mass production basis.

Other objects and advantages will become apparent from the following description, taken together with the accompanying drawing, wherein:

Fig. 1 is a perspective view of an illustrative switch box fitted with mounting flanges and embodying the features of the present invention.

Fig. 2 is a plan view of the switch box shown in Fig. 1.

Figs. 3 and 4 are perspective views of an illustrative box mounting flange.

Fig. 5 is a fragmentary vertical sectional view taken along the line 5—5 in Fig. 2, and additionally showing the relation of the illustrative switch box to a typical wall in which it is mounted.

Fig. 6 is a fragmentary vertical sectional view similar to Fig. 5 with the front of the illustrative switch box offset outwardly from the wall in which it is mounted and yet flush with respect to the finish surface of the wall.

Fig. 7 is a fragmentary vertical sectional view similar to Fig. 6 except that the illustrative mounting flange is shown in reversed relation to the box for accommodating a relatively thick layer of wall finishing material.

Fig. 8 is a side elevational view of the illustrative switch box, showing the mounting of the box within a typical wall recess.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawing, it will be perceived that the invention is there shown embodied in an illustrative switch box 10 which in this instance happens to be adapted for use with flexible metallic conduit known in the trade as "BX" cable. The box 10 comprises a pair of opposed sides 11, 12 and a pair of opposed end walls 14 and 15. The end walls 14, 15 in this instance happen to be integral with a back wall 16 and a pair of intermediate walls 17, 18. The box 10 is provided with a pair of mounting flanges or ears 19 which project from the end panels 14, 15 and receive nails or other fastening devices to hold the box in position. In most installations, the box is situated in the wall so that the plane of its open front, defined by the free edges of the panels 11, 12, 14, 15, will be substantially flush with the finished surface of the wall.

Each of the illustrative ears 19 comprises a single piece of sheet metal stock cut and bent to form a pair of substantially perpendicular legs 20, 21. Both legs are interrupted by a central aperture 22 to provide clearance for a switch attaching tab 24 projecting outwardly from respective ones of the end panels 14, 15. Each tab 24 has a tapped hole therein to receive a switch attaching screw (not shown) and the recess 22 of each ear also provides clearance for such screw.

Provision is made in the box 10 for adjustably attaching the ears 19 to produce a plurality of different offsets between the plane of the box front and the plane of the legs 20 of the mounting ears whereby a wide variety of wall thicknesses and finishes are accommodated. This is accomplished by the use of a series of spaced slots 25 provided in each of the box walls 14, 15 and adapted to receive therein a pair of lugs 26, 28 carried by the ears 19. In this instance the lugs 26, 28 are spaced along the leg 21 of each mounting flange 19 while the other flange leg 20 is disposed for attachment to a wall 29. For the latter purpose the leg 20 is provided with a pair of laterally spaced holes 30 therein for receiving suitable fasteners (not shown).

Flange lug 26 is formed by bending a part of the metal adjacent the central portion of the free end of the leg 21 out of the plane of this leg in a direction opposite to that of the leg 20 to define a substantially perpendicular finger. The extremity of the finger is then bent outwardly to impart an L-shape to the lug. The dimensions of the box slots 25 and the lug 26, respectively, are chosen to permit ready insertion of the lug into one of the slots. In this way, the L-shaped lug 26 serves to anchor the ear 19 to the switch box 10.

Completing the mounting flange structure is the second lug 28, which is disposed on the leg 21 in spaced relationship to the anchoring lug 26. The illustrative lug 28 is formed by bending a part of the metal originally filling the central aperture 22 in the same direction as the anchoring lug 26.

Attention is drawn to the shape of the lug 28, which imparts to it the locking characteristics necessary to assure firm engagement of the mounting ear 19 with the switch box 10. Thus, the lug 28 is bifurcated to present fingers 28a to which a degree of resiliency is imparted through the provision of a central lug recess 31, the fingers being initially spread apart at their outer ends so as to present slightly tapered lateral edges. The box slots 25 are sized to present a longitudinal dimension slightly less than the distance between the outer lateral edges of the fingers 28a. In this way, a snap type action is effected when the spring lug 28 is forced into one of the box slots 25, the bifurcated fingers 28a being successively squeezed together and then allowed to snap back into their normal spaced relation during passage of the lug 28 through the slot.

Attachment of the ears 19 to the switch box walls 14, 15 is easily and quickly effected manually, there being no necessity for using tools. Thus, the leg 21 of one of the ears 19 is initially held substantially perpendicularly to the box wall so that the extremity of the anchoring lug 26 may be inserted through one of the box slots 25. Thereafter, rotation of the base portion of the L-shaped leg 21 into a position parallel with the box wall will permit the lug 26 to slip through the slot 25. The ear 19 may then be snapped into place by forcing the spring lug 28 through one of the slots 25 laterally spaced from that slot engaged by the anchoring lug 26, the leg 21 thus abutting the box wall and being firmly held in parallel relation thereto.

Several different positions of the ears 19 with respect to the plane of the front of the illustrative switch box 10 are shown in Figs. 5, 6 and 7. Here demonstrated are examples of the many different offsets that may be effected as between the plane of the legs 20 and the plane of the box front. Illustrated in Fig. 8 is a typical environment in which the invention may be employed. The illustrative switch mox 10 is there shown in a wall recess 32, the mounting ears 19 being offset from the plane of the box front to an extent similar to that shown in Fig. 6. Thus, the mounting flanges 19 are secured to the box walls 14, 15 in such a manner that the forward flange legs 20 are disposed rearwardly of the front of the box 10 a sufficient distance to accommodate therebetween a finish wall layer 34 of plaster or the like. When the final wall layer 34 has been applied, the box 10 is flush mounted thus making a neat and unobstructive installation.

Of course if no finish wall layer is to be employed, the illustrative mounting ears 19 may be secured to the box 10 in such a manner that the legs 20 are substantially flush with the box front, as shown in Fig. 5. On the other hand, if an unusually thick layer 34 of finishing material is to be applied to the wall 29, it is one of the features of the invention that the mounting ears 19 may be turned end for end before attachment to the box as shown in Fig. 7 so that the legs 20 are disposed almost the full length of the switch box behind the plane of the box front. In this way the mounting ears 19 are reversible and may be interchangeably used in any of the positions shown in the drawings or in any positions intermediate to those shown. Such an arrangement provides a clamping flange 19 which is adjustable laterally of the box by a simple manual operation. It is thus apparent that a wide variety of finish wall thicknesses may be accommodated by the illustrative box mounting arrangement, the switch box always being flush mounted in the wall. Alternatively, the box may be mounted using the present invention so that the box front is positioned outwardly from the finished wall to any desired extent, or recessed further inwardly, if this is desired. To facilitate quickly mounting the box to accommodate a predetermined finish wall thickness, a series of calibrations 35 are provided on one of the box sides 11, 12, being uniformly spaced apart at known intervals such as ⅛ inch or the like.

I claim:

1. In combination with a switch box having an open side and a box panel substantially normal to the plane of said open side, said box panel having a plurality of substantially aligned and uniformly sized slots therein spaced varying distances from the plane of said open box side, a mounting flange for securing the box to a wall and comprising a pair of substantially perpendicular legs, one of said legs having means facilitating attachment to the wall, and the other of said legs carrying a pair of spaced lugs for removable engagement with correspondingly spaced ones of the box slots to firmly secure the mounting flange to the box, one of said lugs having an L-shape for anchoring engagement with one of said box slots and the other of said lugs being slightly oversize over a portion of its length with respect to a second one of said box slots and bifurcated to permit the oversize lug portion to snap into locking engagement with said second slot, said flange being adjustable along the box panel toward and away from the plane of the open side of the box upon engagement of the lugs with others of the box slots for accommodating a variety of finish wall thicknesses between said wall attachment leg and the plane of the open side of the box.

2. In combination with a switch box having an open side and a box panel substantially normal to the plane of said open side, said box panel having a plurality of substantially aligned and uniformly sized slots therein spaced varying distances from the plane of said open box side, a mounting flange for securing the box to a wall and comprising a pair of substantially perpendicular legs, one of said legs having means facilitating attachment to the wall, and the other of said legs carrying a pair of spaced lugs for removable engagement with correspondingly spaced ones of the box slots to firmly secure the mounting flange to the box, one of said lugs being slightly oversize over a portion of its length with respect to one of said box slots and bifurcated to permit the oversize lug portion to snap into locking engagement with said slot, said flange being adjustable along the box panel toward and away from the plane of the open side of the box upon engagement with the lugs with others of the box slots for accommodating a variety of finish wall thicknesses between said wall attachment leg and the plane of the open side of the box.

3. In combination with a switch box having an open side and a box panel substantially normal to the plane of said open side, said box panel having a plurality of slots therein spaced varying distances away from the plane of said open box side, a mounting flange for securing the box to a wall and comprising a single piece of sheet metal stock having an attachment portion for rigid connection with the wall, a plate-like portion lying parallel to and in contact with the exterior of the slotted box panel when the flange is so attached, said flange further having a central aperture therein between said attachment and plate-like portions, first and second lugs rigid with said plate-like portion and extending at substantially right angles thereto, said first lug being formed by bending a part of the metal adjacent the free end of said plate-like portion to define a substantially perpendicular finger and then bending the extremity of the finger outwardly to define an L-shaped lug, said second lug being formed by bending a part of the metal originally filling said aperture at substantially right angles to the attachment portion bordering said aperture, and said lugs being removably engageable with spaced ones of the box slots to permit adjustment of the flange along the box panel toward and away from the plane of the open side of the box whereby a variety of finish wall thicknesses may be accommodated between said attachment portion and the plane of the box front.

References Cited in the file of this patent

UNITED STATES PATENTS

| | | |
|---|---|---|
| 1,154,576 | Maison et al. | Sept. 21, 1915 |
| 1,482,865 | Raus | Feb. 5, 1924 |
| 1,509,288 | Fralick | Sept. 23, 1924 |
| 1,593,412 | Knoderer | July 20, 1926 |
| 2,039,550 | Norton | May 5, 1936 |
| 2,233,731 | Budnick | Mar. 4, 1941 |

FOREIGN PATENTS

| | | |
|---|---|---|
| 189,734 | Switzerland | Mar. 15, 1937 |